United States Patent [19]

Klein

[11] Patent Number: 5,457,853
[45] Date of Patent: Oct. 17, 1995

[54] CABLE TIE MADE OF PLASTIC MATERIAL

[75] Inventor: Jean-Luc R. G. Klein, Ringendorf, France

[73] Assignee: TRW Carr France SNC, Ingwiller, France

[21] Appl. No.: 171,929

[22] Filed: Dec. 21, 1993

[30] Foreign Application Priority Data

Dec. 23, 1992 [FR] France .................................. 92 15610

[51] Int. Cl.$^6$ .................................................. B65D 63/00
[52] U.S. Cl. ........................................ 24/16 PB; 24/17 AP
[58] Field of Search .............................. 24/16 PB, 17 AP, 24/30.5 P

[56] References Cited

U.S. PATENT DOCUMENTS

| | | | |
|---|---|---|---|
| 3,009,220 | 11/1961 | Fein | 24/16 PB |
| 3,708,835 | 1/1973 | Bienz | 24/16 PB |
| 3,991,444 | 11/1976 | Bailey | 24/16 PB |
| 4,001,898 | 1/1977 | Caveney. | |
| 4,008,512 | 2/1977 | Prodel | 24/16 PB |
| 4,958,414 | 9/1990 | Benoit | 24/16 PB |
| 5,088,159 | 2/1992 | LaFleur | 24/16 PB |

FOREIGN PATENT DOCUMENTS

| | | |
|---|---|---|
| 1810515 | 7/1969 | Germany. |
| 2045300 | 3/1971 | Germany. |
| 2532062 | 7/1975 | Germany. |
| 2135382 | 8/1984 | United Kingdom. |

*Primary Examiner*—Victor N. Sakran
*Attorney, Agent, or Firm*—Daniel G. Blackhurst

[57] ABSTRACT

A cable tie 1 made of plastic material with a tape portion 2, equipped with stop elements 3, and connectable with a stop zone 4 comprised of a bottom plate 5 and two side walls 6, 7, with an interpositioned cross piece 8. A stop nose 9 is carried by cross piece 8 for engagement with one of the stop elements upon arrest of tape 2 in the stop zone 4. A release element 10 is arranged at the stop region 4 for releasing the arrested tape. The stop zone 4 can thereby be transferred from an open position I into a closed position II and locked therein by the release element 10, and vise versa.

12 Claims, 1 Drawing Sheet

CABLE TIE MADE OF PLASTIC MATERIAL

BACKGROUND OF THE INVENTION

The subject invention relates to a cable tape or tie made of plastic with a tape zone equipped with locking elements that is joined to a stop zone comprised of a bottom plate and two side walls with an interpositioned cross-piece having a latch for engagement with one of the locking elements upon arresting the tape zone in the stop zone and having a release element arranged at the stop zone for selective disengagement of the latch.

Such a cable tape is already known as state of the art; it is designed in such manner that the release element is arranged above the stop zone and is connected therewith by thin cross-pieces (see German printed specification 2,045,300). Upon triggering of the release element, the respective stop element of the tape that is cooperating with the latch is released from its locked position so that the cable tape can be opened. Even after opening of the cable tape, the stop zone in this known construction exhibits a channel closed on all sides. This construction is costly to manufacture due to its required accuracy.

In another known construction, the stop zone is connected with the bottom plate via a thin film hinge of articulation and is rotated upon engagement with the respective stop element of the tape zone in an upward direction in order to improve the holding effect between the stop zone on the one side and the stop element on the other side (see German printed specification 1,810,515). In this construction, the stop zone with the latch is also designed as a closed channel.

Further state of the art is a cable tape or tie where the latch is designed in the shape of a hook that is positioned opposite an elastic counter stop. (This is shown in U.S. Pat. No. 4,001,898.) With both of the above described constructions, it is difficult to simply disengage the tape after it has been locked in the stop zone. Consequently, opening of the cable tape cannot readily be accomplished.

SUMMARY OF THE INVENTION

In contrast, the present invention has for its object, based on the initially discussed state of the art, to create a cable tape which facilitates with a simpler construction, improved handling during opening and locking.

According to the invention, this task is solved in that the stop zone is transferable from an open position to a locked position by means of the release element, and vice versa. In order to simplify production, the stop zone is initially present as an open unit which, upon transfer to closed position, forms a closed channel with the top of the latch. In such an arrangement, the stop zone with the associated bottom plate and side walls is designed as a unit connected via film hinge articulations.

In a further refinement of the invention, the bottom plate and the first side wall are rigidly connected with the cross-piece and the stop latch, and the second side wall can be connected with the cross-piece via a second film hinge articulation. The second side wall rigidly adjoins the release element at a right angle. It is connectable in the anterior zone via a locking mechanism with the anterior zone of the first side wall. Thus, the locking zone comprises a total of three units that, respectively, are connected with each other via film hinge articulations and which can be transferred from open position to closed position and locked into place.

In a further refinement of the invention, the cross-piece can be designed as an "H"-shape, whereby the nose of the stop latch is positioned at the cross leg and the end zones of the two long legs are connected with the bottom plate via the first film hinge articulation. The long leg of the cross-piece can adjoin the first side wall and the other long leg can adjoin the second side wall via the second film hinge articulation.

The second side wall and the release element can include at least one recess into which is positionable in closed position, a stop at the anterior zone of the first side wall and a stop nose of the bottom plate. Thus, there results excellent locking of the individual elements of the stop zone such that after completion of use of the cable tape the latter can again be disengaged and moved to open position through opening of the stop zone.

In this arrangement, when the stop zone is in its closed position the anterior end of the release element may protrude from the exterior surface of the first side wall. Thus, it is possible, through lifting of the protruding part, to again disengage the various latches and to transfer the entire stop zone from closed position to open position.

In further perfection of the invention, the arrest nose may laterally be positioned at a column connected with the bottom plate. With the arrest element in its closed position, the column, which is equipped with an acute angle-shaped end zone, is positioned opposite the stop nose and forms a counter stop for the locking elements of the tape zone. Moreover, the counter stop is capable of absorbing the traction of the tape and to relieve the elastic connection.

According to another aspect of the invention, there may be an insertion slant beneath the cross leg such that in the closed position, it may protrude into a recess formed into the bottom plate.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
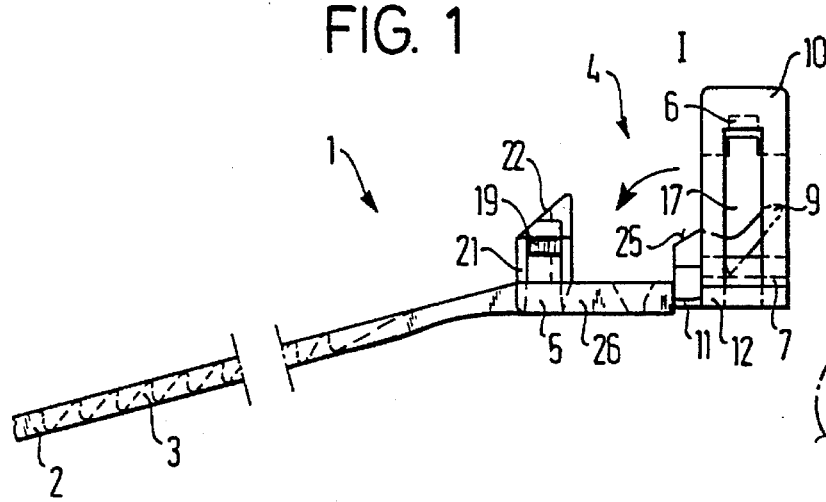
FIG. 1 is a lateral view of the cable tape in its open position 1.

Referring more particularly to the drawings wherein the showings are for the purpose of illustrating a preferred embodiment of the invention only and not for the purpose of limiting same, the cable tie or tape device 1 shown in FIGS. 1 to 4 is manufactured as an injection molded, one piece unit formed of a suitable plastic material. It comprises, in general, a tape portion 2 and a stop zone 4. The tape portion 2 is defined by an elongated flexible tape or strap-like member provided with a number of stop elements 3, which may be designed in step- or ladder-like fashion.

In the embodiment illustrated, the stop elements 3 are shown as having an inclined V-shape to provide a series of notches or pointed tooth-like elements. The stop zone 4 into which the tape portion 2 is inserted during use broadly includes a bottom plate 5 and two side walls 6 and 7.

Between the side walls 6, 7 there is interpositioned a cross-piece 8 with a stop nose 9. The stop nose 9 has the function of engaging with one of the stop elements 3 to arrest the tape portion 2 in the stop zone 4 at a selected point of engagement. As is apparent from FIG. 3, there is rigidly shaped onto side wall 7 a release element 10 that is positioned at a right angle vis-a-vis the second side wall 7.

The bottom plate 5 and the first side wall 6 are connected with each other via a first film hinge articulation 11, 11. A second film hinge articulation 12 connects the second side wall 7 with the cross-piece 8. At the second side wall 7, the release element 10 is rigidly joined at a right angle. The release element 10 is connectable in the anterior zone via a locking mechanism 13 with a stop 18 located in the anterior zone of the first side wall 6.

Figure 4:
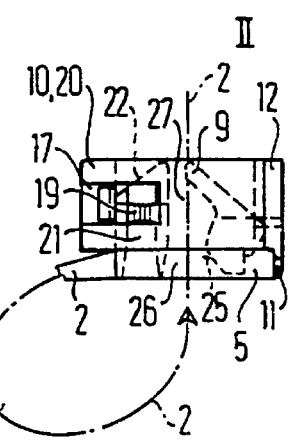
FIG. 4 is the stop zone of the cable tape transferred to its closed position according to FIGS. 1 through 3.

When comparing FIGS. 1 and 4, it is apparent that the stop zone 4 can be transferred from an open position I into a lockable, closed position II by means of release element 10 and other locking arrangements. By activation of the release element 10, it is possible to transfer the stop zone 4 from closed position II according to FIG. 4 into the open position I according to FIG. 1. Thus, there is provided the possibility of re-use of the cable tape device 1 according to the invention since the film hinge articulations 11 and 12, respectively, allow transfer of the individual parts of stop zone 4 from open to closed position and vice-versa without damage to the cable tape.

Cross-piece 8 is connected with the first side wall 6 and is designed in the shape of an "H". Thus, the stop nose 9 is placed at cross leg 14. Cross leg 14 connects between two long legs 15 and 16, that are in turn, according to FIGS. 1 and 2, connected in their end zones via the first film hinge articulation 11, 11 with the bottom plate 5.

The first side wall 6 adjoins the long leg 15 of cross-piece 8. The second side wall 7 adjoins the other long leg 16 via the second film hinge articulation 12.

Figure 2:
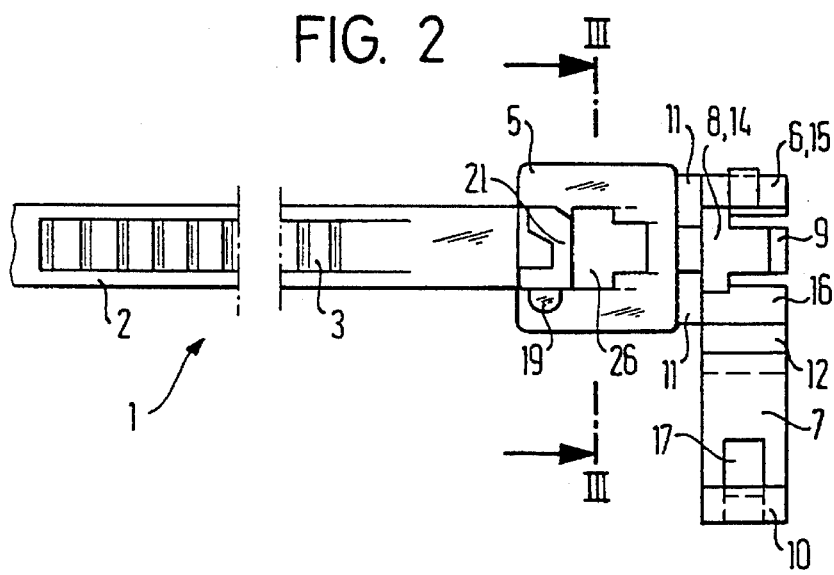
FIG. 2 is a stop plan view of the cable tape according to FIG. 1.

The release element 10 and the second side wall 7 include, as best seen in FIGS. 1 and 2, a slot-like recess 17. The function of the recess 17 is to receive in the closed position II according to FIG. 4, the stop element 18 located in the anterior zone of the first side wall 6. Concurrently, a stop nose 19 carried by bottom plate 5 positions itself in recess 17.

The stop nose 19 is laterally arranged at column 21 which is connected with bottom plate 5. In closed position II of FIG. 4, column 21, equipped with an acute-angle-shaped end zone 22 as shown in FIG. 1, faces stop nose 9 and forms a counter stop for the stop elements 3 of tape portion 2. The counter stop is capable of absorbing a portion of the tension forces of tape portion 2 and to relieve the elastic connections between the stop nose 9 and the stop elements 3.

Figure 3:
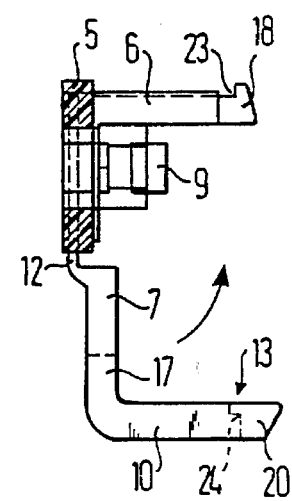
FIG. 3 is a sectional view taken on line III—III of FIG. 2.

It is apparent from FIG. 3 that catch stop 18 is arranged in the median zone of the first side wall and carries a shoulder 23, as seen in FIG. 3. The shoulder 23 can position itself in a cooperating counter shoulder 24 in recess 17 of release element 10.

Bottom plate 5, according to FIG. 2, includes a recess 26 into which an insertion slant 25 can position itself in the closed position II. Insertion slant 25 joins to the bottom of cross leg 14 and extends therefrom.

According to FIGS. 1, 2, and 3, stop zone 4 is shown in open position I. In order to transfer the stop zone 4 from the open position I to closed position II of FIG. 4, the second leg 7 with the rigid right angle release element formed thereon is rotated in a counterclockwise direction around the film hinge articulation 12 according to FIGS. 3 until the shoulder 23 of the first side wall 6 positions itself in the counter shoulder 24 of recess 17 of release element 10.

Thus, the first installation step is completed. The two side walls 6 and 7 are now positioned parallel and are connected in an interlocked state on the one side by virtue of the release element 10 engaged with side wall 6 by means of shoulder 23 and counter shoulder 24. A connection on the other side exists by means of the "H"-shaped cross-piece 8. The thusly pre-mounted unit is now rotated according to FIG. 1 in a counterclockwise direction around film hinge articulation 11, until the closed position II according to FIG. 4 has been attained.

In the closed position II, the stop nose 19 of column 21 is positioned in recess 17 in the area of the second side wall 7. Thus, there now exists a closed through channel 27 relative to the stop zone 4 according to FIG. 4.

By transferring stop zone 4 from the open position I according to FIG. 1, into the closed position II according to FIG. 4, the stop zone 4 now exhibits the noted passage channel 27. Projecting into channel 27 is the stop nose 9 and the column 21 with the acutely angle shaped end zone 22.

If now, according to FIG. 4, the tape zone 2 with its stop elements 3 is inserted in the direction of the arrow into the through channel 27, the elastic stop nose 9 can position itself in any given stop element 3 of tape portion 2, and thereby, for example, safely surround a tube or wire bundle. In such arrangement, the elastic stop nose 9 presses the corresponding stop element 3 against column 21, so that excellent holding is provided.

It is evident from FIG. 4, that in the area underneath stop nose 9, the cross-piece 8 exhibits an insertion slant 25. In the closed position II, the insertion slant 25 is located in the narrower zone of recess 26 of bottom plate 5. Thus, when introducing tape portion 2 through the recess 26, the tape portion 2 is properly guided during insertion into the passage channel 27 of stop zone 4 in a direction toward the elastic stop nose 9 and toward column 21.

If the entire unit is to be disassembled, the anterior end 20 of release element 10, according to FIG. 4, is rotated in a counterclockwise direction around film hinge articulation 12. Thereby, shoulder 23 of the first side wall 6 disengages from the counter shoulder 24 of the release element 10. Passage channel 27 thus no longer exists and the respective stop element 3 of tape portion 2 can disengage itself from the stop nose 9.

Following this procedure, the thus pre-assembled unit is rotated around the film hinge articulation 11 in the clockwise direction until the position according to FIGS. 1 to 3 has again been reached. Thus, the stop zone 4 has been transferred from its closed position II according to FIG. 4 into its open position I according to FIG. 1.

The inventive cable tape device 1, when in its open position I, does not exhibit a closed passage channel 27 in the stop zone 4. The passage channel 27 with projecting stop nose 9 is formed only when the individual units of the stop zone 4 that connect respectively with one another by means of film articulations 11 and 12 are transferred from their open position I into the closed position II. Only two mounting segments are required.

Conversely, the entire unit can easily be transferred from a mounted to an unmounted position in that the release element is simply flipped or rotated to thus open the stop zone 4. There now exists a cable tape device 1, which can be reused many times, which is easily installed or removed, but which can otherwise absorb great forces and act in a functionally highly secure manner.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A plastic cable tie comprising:

an elongated tape having a plurality of stop elements;

a stop zone joined to the tape and including a bottom plate having an opening and spaced side walls with an engagement nose means for positioning in a first position for engaging the stop elements and arresting the tape when the tape is extended through the opening;

hinge means joining the engagement nose means to the bottom plate for permitting movement of the engagement nose means from the first position to a second position for releasing the tape;

release latch means for selectively latching the engagement nose means in the first position;

the bottom plate being connected with one of the side walls and the engagement nose means by a first film hinge and the other of the side walls and the release latch means are joined to the first side wall and the engagement nose means by a second film hinge; and, the other of the side walls connected with the release latch means, the release latch means including locking means for permitting connection to the said one of the side walls.

2. A plastic cable tie as defined in claim 1 wherein there is a cross piece designed in the shape of an "H" having a cross leg and two long side legs and wherein the engagement nose means is positioned at the cross leg and end zones of the two long legs are connected with the bottom plate via a first film hinge articulation.

3. A plastic cable tie as defined in claim 2 wherein one long leg of the cross piece adjoins one of the side walls and the other long leg adjoins the other side wall via a second film hinge articulation.

4. A cable tie according to claim 2 wherein beneath the cross leg there is formed a slanted surface to guide insertion of the tape into engagement with the engagement nose means.

5. A cable tie according to claim 4 wherein the slanted surface is formed on a protrusion that projects into a recess in the bottom plate.

6. A plastic cable tie as defined in claim 1 wherein one of the side walls and the release latch means have at least one recess which can receive a latching element carried on the other side wall and a stop nose element carried on the bottom plate.

7. A cable tie according to claim 6 wherein the stop nose element is laterally arranged on a column connected with the bottom plate.

8. A cable tie according to claim 7 wherein the stop zone includes a column equipped with an acute-angle-shaped end region that faces the engagement nose and forms a counter stop for the stop elements of the tape.

9. A cable tie according to claim 6 wherein one of the side walls includes a catch stop portion and the release latch means includes a recess that receives the catch stop portion.

10. A cable tie according to claim 1 wherein the release latch means includes a portion that projects over the outer surface of one of the side walls.

11. A plastic cable tie comprising:

an elongated tape having a plurality of stop elements;

a stop zone joined to the tape and including a bottom plate having an opening therethrough spaced first and second side walls extending from the bottom plate with the first of the side walls carrying an engagement nose means for positioning in a first position for engaging the stop elements and arresting the tape when the tape is extended through the opening;

hinge means joining to said first side wall and the engagement nose means to the bottom plate for permitting movement of the said first side wall and the engagement nose means from the first position to a second position for releasing the tape; and, release latch means carried by a second of the spaced side walls for selectively latching the said one side wall and the engagement nose means in the first position.

12. The plastic cable tie as set forth in claim 11 wherein the said second side wall is hinged to the said first side wall.

* * * * *